United States Patent [19]
Mori

[11] Patent Number: 4,721,350
[45] Date of Patent: Jan. 26, 1988

[54] LIGHT DISTRIBUTION ARRANGEMENT

[76] Inventor: Kei Mori, 3-16-3-501, Kaminoge, Setagaya-ku, Tokyo, Japan

[21] Appl. No.: 558,090

[22] Filed: Dec. 5, 1983

[51] Int. Cl.⁴ .............................................. G02B 6/26
[52] U.S. Cl. ............................. 350/96.15; 350/96.10; 350/259; 362/32
[58] Field of Search .................... 350/96.1, 96.34, 286, 350/259, 96.15, 96.24; 362/32

[56] References Cited

U.S. PATENT DOCUMENTS 3,611,359  10/1971  Panerai ........................ 350/96.1 X

FOREIGN PATENT DOCUMENTS

| | | | |
|---|---|---|---|
| 2937580 | 4/1981 | Fed. Rep. of Germany ... | 350/96.15 |
| 3147873 | 6/1983 | Fed. Rep. of Germany ... | 350/96.15 |
| 56-75602 | 6/1981 | Japan ............................... | 350/96.15 |
| 0085703 | 7/1981 | Japan ............................... | 350/96.15 |
| 0111811 | 9/1981 | Japan ............................... | 350/96.15 |
| 0003411 | 1/1984 | Japan ............................... | 350/96.15 |

*Primary Examiner*—John Lee
*Attorney, Agent, or Firm*—Jordan and Hamburg

[57] ABSTRACT

An arrangement for effectively distributing light from a first or main light conducting member into a second or branch light conducting member is disclosed. The second light conductor is movable relative to the first to selectively receive light therefrom. The first light conductor is formed with a radial bore in which the second light conductor is movably received. The end face of the second light conductor adjacent to the first light conductor is inclined and finished to mirror surface. The first light conductor has a unique configuration for effective distribution of light and elimination of undesirable fringes in the output light.

14 Claims, 6 Drawing Figures

LIGHT DISTRIBUTION ARRANGEMENT

BACKGROUND OF THE INVENTION

The present invention relates to a system for guiding converged sunlight or the like to a desired location by means of an elongate light conducting member for various applications such as room lighting. More particularly, the present invention is concerned with a light conduction arrangement which effectively distributes part of light from a main conduction path to a branch conduction path.

Effective use of solar energy is the key to energy saving today and has been studied in various fields actively. For the most effective use of solar energy, solar energy has to be availed as it is without being transformed into another kind of energy such as thermal energy or electrical energy. In light of this, I have made various proposals for an illumination system which utilizes solar energy. The illumination system employs a fiber optic cable through which the sunlight converged by a lens or the like is conducted to a desired location to stream out thereat to illuminate the ambience.

Where an attempt is made to utilize solar energy for illumination in the manner described, the usefulness will be significantly enhanced if an arrangement is available for distributing the light propagating through the cable to a desired branch conduction path. It is also desirable that a quantity of light steered into the desired branch path be controllable. These have not been implemented satisfactorily so far in the art concerned.

SUMMARY OF THE INVENTION

It is therefore an object of the present invention to provide a light distribution arrangement which is capable of effectively distributing light from a main light conduction path to a branch light conduction path.

It is another object of the present invention to provide a light distribution arrangement which is capable of steering a controllable quantity of light from a main light conduction path to a branch light conduction path.

It is another object of the present invention to provide a simple light distribution arrangement.

It is another object of the present invention to provide a generally improved light distribution arrangement.

An arrangement for distributing light propagating through a main conduction path into a branch conduction path of the present invention comprises a first light conducting member for defining the main conduction path which extends from a source of light supply, the first light conducting member comprising a first cylindrical portion, a first conical portion tapering from the first cylindrical portion, a second conical portion flaring from the first conical portion, and a second cylindrical portion extending from the second conical portion, and a second light conducting member for defining the branch conduction path, the second light conducting member being movable toward and away from the first conical portion of the first light conducting member to selectively receive light output therefrom.

In accordance with the present invention, an arrangement for effectively distributing light from a first or main light conducting member into a second or branch light conducting member is disclosed. The second light conductor is movable relative to the first to selectively receive light therefrom. The first light conductor is formed with a radial bore in which the second light conductor is movably received. The end face of the second light conductor adjacent to the first light conductor is inclined and finished to mirror surface. The first light conductor has a unique configuration for effective distribution of light and elimination of undesirable fringes in the output light.

The above and other objects, features and advantages of the present invention will become apparent from the following detailed description taken with the accompanying drawings.

DESCRIPTION OF THE PREFERRED EMBODIMENTS

While the light distribution arrangement of the present invention is susceptible of numerous physical embodiments, depending upon the environment and requirements of use, substantial numbers of the herein shown and described embodiments have been made, tested and used, and all have performed in an eminently satisfactory manner.

Figure 1:
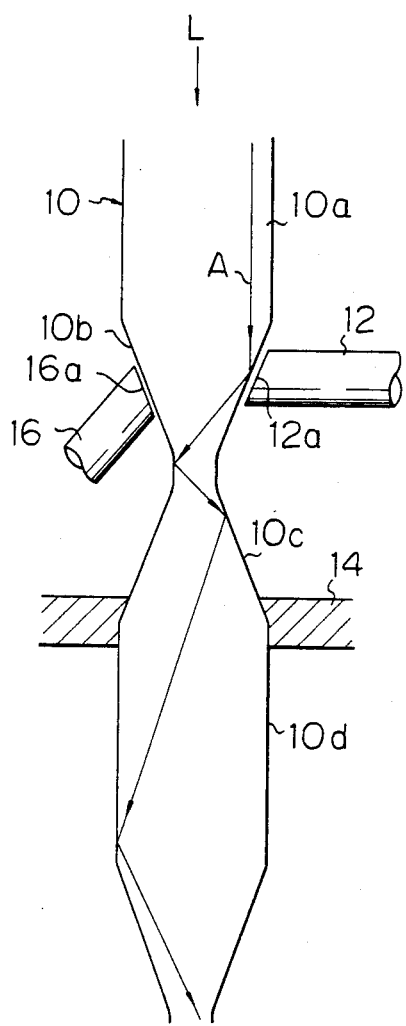
FIG. 1 is a schematic side elevation of a light distribution arrangement embodying the present invention.

Referring to FIG. 1 of the drawings, a light distribution arrangement embodying the present invention is shown and includes a first light conducting element 10 and a second light conducting element 12. The first light conductor 10 constitutes a main conduction path which extends from a source of light supply (not shown) to any desired location. A solar ray L, for example, converged by a lens or the like at the source propagates through the light conductor 10 as indicated by an arrow A in the drawing, while being repeatedly reflected by the wall of the light conductor 10. As shown, the light conductor 10 comprises at least one unit or module configuration made up of a cyindrical portion 10a, a conical portion 10b tapering from the cylindrical portion 10a, a conical portion 10c flaring from the conical portion 10b, and a cylindrical portion 10d extending from the conical portion 10c. A support member 14 supports the light conductor 10 at the flaring conical portion 10c for the purpose which will be described.

The second light conductor 12 has a light receiving surface 12a which faces the periphery of the tapering conical surface 10b of the light conductor 10. The light conductor 12 may be constructed to be movable into and out of contact with the conical surface 10b or may be detachably mounted. Having the above construction, the second light conductor 12 defines a branch light conduction path as will be described.

While the light L propagates through the light conductor 10, the numerical aperture (N.A.) is large in the tapering conical portion 10b and small in the flaring conical portion 10c. Therefore, the light readily leaks to the outside at the conical portion 10b but not at the other conical portion 10c. When the light receiving end 12a of the branch conductor 12 is engaged with the conical portion 10b, the light transmitted through the main conductor 10 is partly steered effectively into the branch conductor 12 due to the large N.A. If the branch conductor 12 is disengaged from the main conductor 10, the light will advance through the main conductor 10 without being distributed into the branch conductor 12. The support member 14 holds the flaring conical portion 10c of the light conductor 10 without any leakage of light, since the N.A. is small there.

As well known in the art, when light is transmitted through a light conductor over a substantial length, a fringe or rainbow pattern develops in the light radiated from the light conductor. Another advantage attainable with the contiguous conical portions 10b and 10c is that they cancel such undesirable pattern, the light output from the light conductor 1 or 2 being free from the fringe or rainbow pattern.

In the particular embodiment shown in FIG. 1, another branch conductor 16 with a light receiving end 16a is located at the tapering conical portion 10b of the light conductor. However, only one or more than two such branch light conductors may of course be employed.

Figure 2:
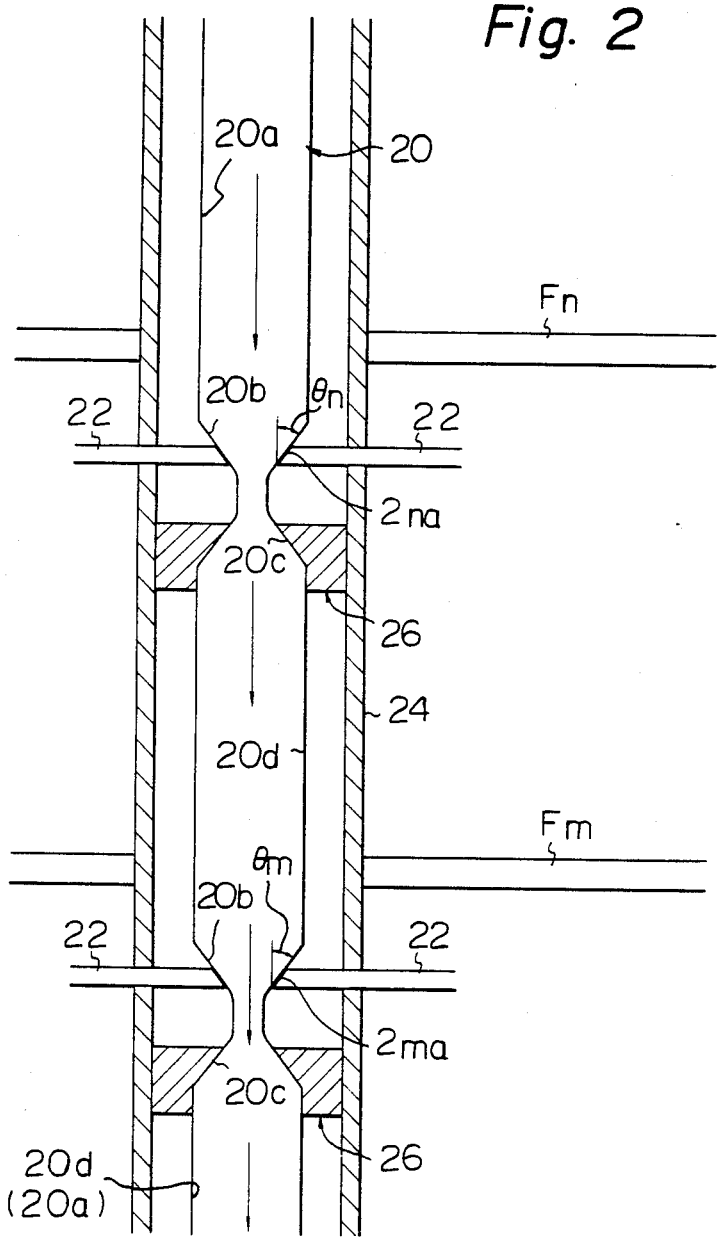
FIG. 2 is a view similar to FIG. 1 but showing a second embodiment of the present invention which is applied to a multi-story building.

Referring to FIG. 2, another embodiment of the present invention is shown which is applied to room lighting in a multi-story building, for example. A first light conductor 20 shown in FIG. 2 comprises a plurality of unit or module configurations sequentially connected along the direction of light propagation and each being made up a cylindrical portion 20a, a tapering conical portion 20b, a flaring conical portion 20c and a cylindrical portion 20d extending from the conical portion 20c. A plurality of second light conductors 22 are associated with each of the tapering conical portion 20b. The light conductor 20 is bodily accommodated in a casing 24 and securely mounted thereto by support members 26. The casing 24 extends throughout the building which is schematically represented by floors (or ceilings) Fn and Fm. The function of the arrangement shown in FIG. 2 is analogous in principle to that of the arrangement shown in FIG. 1; light propagating through the main conductor 20 is effectively distributed to the branch conductors 22 and therethrough to desired rooms in the building.

In the embodiment shown in FIG. 2, a solar collector (not shown) may be installed on top of the building to supply light collected thereby into the main conductor 20. Then, the light is distributed to the respective branch conductors 22 at each floor. In such a case, the casing 24 not only protects the light conductor 20 but also serves to support it therein. The support members 26 may be designed to hermetically partition the interior of the casing 24 as illustrated for the purpose of eliminating the so-called chimney effect in the event of fire. The hermetically partitioned casing 24 also serves to eliminate heat convection or entry of dust under ordinary conditions.

The casing 24 may be made of a transparent material to facilitate observation of contamination on the main conductor 20 and positions of the branch conductors 22 from outside the casing, while furnishing the arrangement with a decorative effect. This, however, brings about another problem that when the main conductor 20 has been scratched or gathered dust, it allows the light to leak to appear glaring or endangers persons therearound due to the significant energy density. It is preferable, therefore, to form the branching portions and their neighborhood of a transparent material and the rest, of an opaque material.

Further, in the arrangement shown in FIG. 2, distribution of a sufficient quantity of light is unattainable for branch conductors 22 located at the relatively downstream side. To solve this problem, the tapering angle of the tapering conical portions 20b of the main conductor 20 may be sequentially increased toward the downstream end ($\theta_n < \theta_m$ in the drawing), or the area of the light receiving surfaces of the branch conductors 22 may be sequentially increased toward the downstream end ($2na < 2ma$).

Figure 3:
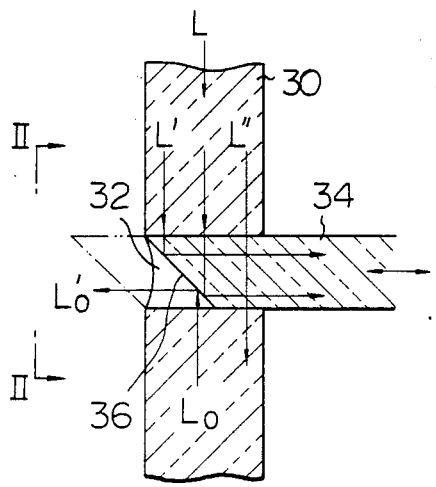
FIGS. 3 and 4 are views of a third embodiment of the present invention equipped with means for controlling the quantity of light distribution.
Figure 4:
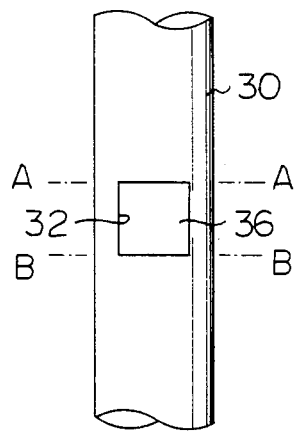

Referring to FIGS. 3 and 4, another embodiment of the present invention is shown which is capable of controlling the quantity of light distribution from the main conduction path to the branch conduction path within a predetermined range. As shown, a first or main light conducting member 30 has a substantially straight configuration and, as in the foregoing embodiments, transmits light L which is converged by a lens or the like. The main conductor 30 is formed with a bore 32 extending radially therethroughout. A second or branch conductor 34 is movably and detachably received in the bore 32. The end 36 of the branch conductor 34 adjacent to the main conductor 30 is formed aslant relative to a plane which is perpendicular to the axis of the branch conductor 34. The inclined surface 36 is finished to mirror surface for reflection. In this construction, a light ray L' incident on the inclined surface 36 of the branch conductor 34 is reflected thereby to be steered into the branch conductor 34, while a light ray L'' advancing through a portion of the branch conductor 34 other than the inclined surface 36 is routed directly into the main conductor 30.

The quantity of light distributed from the main conductor 30 into the branch conductor 34 is adjustable by varying the position of the branch conductor 34, i.e., inclined surface 36 thereof, relative to the main conductor 30. In the illustrated position of the branch conductor 34 in the bore 32, a maximum quantity of light will be allowed into the branch conductor 34. As the branch conductor 34 is moved deeper into the main conductor 30, the quantity of light distribution to the branch conductor 34 becomes smaller; it becomes practically zero in a position indicated by a phantom line in FIG. 3.

Figure 5:
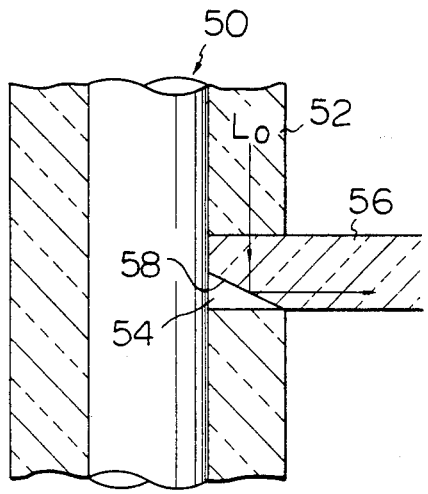
FIG. 5 is a sectional view of a fourth embodiment of the present invention which is similar to the third embodiment except for the configuration of a main light conductor.

The arrangement shown in FIG. 3 is operable as a photoradiator if desired. Positioning the branch conduit 34 upside down, that is, assuming light is supplied into the main conductor 30 in the direction $L_o$, the light $L_o$ will be reflected outwardly by the inclined branch conductor surface 36 as indicated by an arrow $L'_o$.

Where use is made of a light conducting pipe for the main conductor, the principle described with reference to FIGS. 3 and 4 may be embodied in the manner shown in FIG. 5. In FIG. 5, a tubular main conductor 50 has an annular wall 52 and a through bore 54 formed in the annular wall 52. A branch conductor 56 is formed with an inclined and mirror-finished surface 58 and movably received in the through bore 54 in the main conductor 50. In this conduction arrangement, light $L_o$ propagating through the wall 52 of the main conductor 50 will be reflected by the inclined branch conductor surface 58 into the branch conductor 56.

Figure 6:
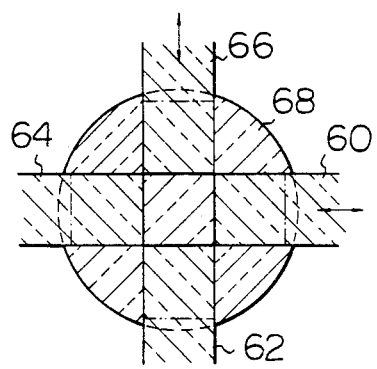
FIG. 6 is a sectional plan view of a fifth embodiment of the present invention.

If desired, as shown in FIG. 6, a plurality of branch conductors such as 60–66 may be arranged in a same horizontal plane to receive light from a single main conductor 68. Such a set of branch conductors 60-66 may be arranged at a plurality of locations spaced along the axis of the main conductor 68.

In the case where a single main conductor is machined with a bore and the walls of the bore finished to mirror surface, difficulty may be experienced in removing chips deposited thereon. In practice, therefore, it is preferable to bisect the main conductor at a position indicated by line A—A or B—B in FIG. 4, finishing the connecting surface of one of the two conductor parts, forming a recess in the connecting surface of the counterpart, finishing the walls of the recess and the connecting surface contiguous therewith to mirror surface, and then interconnecting the two finished parts to each other.

In summary, it will be seen that the present invention provides a new and simple light distribution arrangement which is capable of effectively distributing light from a main conduction path to a branch conduction path.

Various modifications will become possible for those skilled in the art after receiving the teachings of the present disclosure without departing from the scope thereof.

What is claimed is:

1. An arrangement for distributing light propagating through a main conduction path into a branch conduction path, comprising a first light conducting member defining the main conduction path and having an axis extending from a source of light supply, said first light conducting member comprising a first cylindrical portion, a first conical portion tapering from said first cylindrical portion, a second conical portion flaring from said first conical portion, and a second cylindrical portion extending from said second conical portion; a second light conducting member defining the branch conduction path, said second light conducting member having a light receiving surface, said second light conducting member being movable toward and away from the first conical portion of the first light conducting member to thereby move said light receiving surface into and out of contact with said first conical portion such that when said light receiving surface contacts said first conical portion, the light being transmitted through the first light conducting member passes into said second light conducting member and when said light receiving surface is out of contact with said first conical portion, the light being transmitted through the first light conducting member will advance through the first light conducting member without passing into said second light conducting member, whereby the passage of light into said second light conducting member is controlled by said movement of said second light conducting member.

2. An arrangement as claimed in claim 1, including means for supporting the first light conducting member at the second conical portion.

3. An arrangement as claimed in claim 2, further comprising a casing for accommodating the first light conducting member therein.

4. An arrangement as claimed in claim 3, wherein the means for supporting the first light conducting member at the second conical portion partitions an interior of the casing.

5. An arrangement as claimed in claim 1, including a plurality of second light conducting members defining a plurality of branch conduction paths, each of said second light conducting members being individually movable toward and away from the first conical portion.

6. An arrangement as claimed in claim 1, in which the first light conducting member comprises a light conducting rod.

7. An arrangement as claimed in claim 1, in which the first light conducting member comprises a light conducting pipe.

8. An arrangement as claimed in claim 1, wherein the main conduction path comprises a plurality of first light conducting members connected in sequential array, each first light conducting member comprising a first cylindrical portion, a first conical portion tapering from said first cylindrical portion, a second conical portion flaring from said first conical portion, and a second cylindrical portion extending from said second conical portion, and wherein said branch conduction path comprises a plurality of second light conducting members, each of said second light conducting members being associated with one of the first light conducting members such that the plurality of second light conducting members are disposed in sequential array, each of said second light conducting members being movable toward and away from the first conical portion of the associated first light conducting member to selectively receive light therefrom.

9. An arrangement as claimed in claim 8, wherein each first conical portion has a tapering angle, the tapering angle of each first conical portion being larger than the tapering angle of a preceding first conical portion in the direction of light propagation from the light source through the main conduction path such that there is a difference in the tapering angle of each first conical portion and the tapering angle of a preceding first conical portion in the direction of light propagation from the light source through the main conduction path, said difference in said tapering angle constituting distribution-control means for controlling the distribution of light passing into each of said plurality of said second light conducting members.

10. An arrangement as claimed in claim 8, wherein each of said second light conducting members includes a light receiving surface, each of said light receiving surfaces having a specific area, the specific area of each light receiving surface on each sequentially arrayed second light conducting member being progressively larger in the direction of light propagation from the light source through the main conduction path such that there is a difference in specific area on each sequentially arrayed second light conducting member, said difference in said specific area constituting distribution-control means for controlling the distribution of light passing into each of said plurality of said second light conducting members.

11. An arrangement as claimed in claim 1, wherein the first light conducting member is opaque and the second light conducting member is transparent.

12. An arrangement as claimed in claim 1, wherein the first conical portion has a first numerical aperture and the second conical portion has a second numerical aperture, the first numerical aperture being larger than the second numerical aperture.

13. An arrangement for distributing light propagating through a main conduction path into a branch conduction path, comprising:
a first light conducting member defining the main conduction path and having an axis extending from a source of light supply, said first light conducting member comprising a first cylindrical portion, a first conical portion tapering from said first cylindrical portion, a second conical portion flaring contiguously from said first conical portion, and a second cylindrical portion extending from said second conical portion; and a second light conducting member defining the branch conduction path, said second light conducting member having an axis, and control means for controlling a quantity of light to be distributed from the first light conducting member into the second light conducting member, said control means comprising a bore formed radially through the first light conducting member and an end face formed on the second light conducting member, the end face being inclined relative to a plane which is perpendicular to the axis of the second light conducting member, the end face being finished to a mirror surface, and the second light conducting member being movably received in said bore in the first light conducting member for moving said inclined end face into positions in and out of the first conducting member, whereby the quantity of light distributed is determined by the position of the inclined end face.

14. An arrangement as claimed in claim 13, wherein a plurality of the second light conducting members and a plurality of the control means for controlling the quantity of light to be distributed from the first light conducting member to each second light conducting member are located along the axis of the first light conducting member.

* * * * *